H. F. HOGAN.
Churn.

No. 219,945. Patented Sept. 23, 1879.

WITNESSES
Robert Everett
James J. Sheehy

INVENTOR
Hugh F. Hogan
Gilmore, Smith & Co,
ATTORNEYS

UNITED STATES PATENT OFFICE.

HUGH F. HOGAN, OF ALBION, INDIANA, ASSIGNOR OF ONE-THIRD OF HIS RIGHT TO JAMES J. LASH, OF SAME PLACE.

IMPROVEMENT IN CHURNS.

Specification forming part of Letters Patent No. 219,945, dated September 23, 1879; application filed August 30, 1879.

*To all whom it may concern:*

Be it known that I, HUGH F. HOGAN, of Albion, in the county of Noble and State of Indiana, have invented certain new and useful Improvements in Churns; and I do hereby declare that the following is a full, clear, and exact description of the construction and operation of the same, reference being had to the annexed drawings, making a part of this specification, and to the letters and figures of reference marked thereon.

Figure 1:
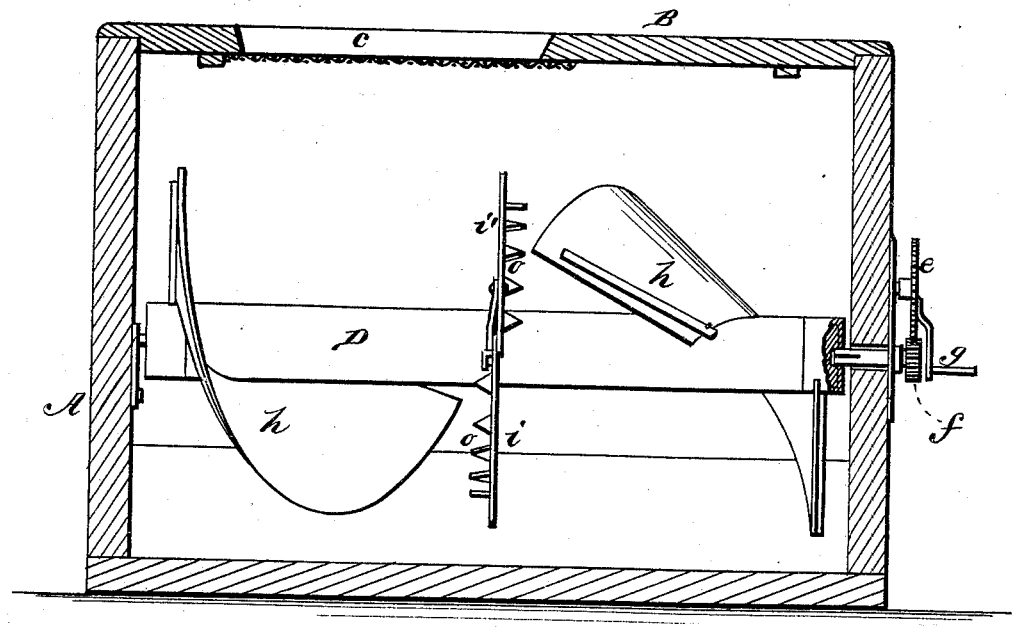
Figure 2:
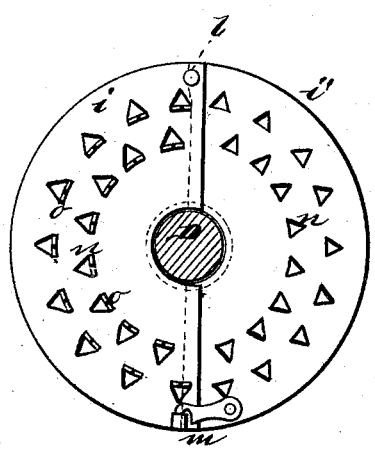

Figure 1 of the drawings is a representation of a vertical section of my churn, and Fig. 2 is a sectional view of the dasher-shaft.

The nature of my invention consists in an improvement in churns, as will be fully described in the following specification, and particularly pointed out in the claims.

A designates the body of the churn; B, its cover, and *c* an opening which is formed through the said cover, and covered with wire-gauze.

D designates the dasher-shaft, and *e f* the gear-wheels upon the exterior of the churn, which are adapted to actuate the shaft when the handle *g* of the upper gear-wheel is turned round.

The dasher is composed of the two metal plates or strips *h h*, which are arranged spirally upon the shaft D, as herein shown, and also upon opposite sides. In addition to cutting through the globules of cream, these strips have, by reason of their curvature, a tendency to throw or impel the cream from one end of the churn to the other; and to further aid in the production of such currents, and in the breaking of the globules of cream, I arrange upon the rotary shaft, between the two strips or dashers, a disk composed of the two halves *i i'*, pivoted together at *l*, and locked at *m* by a hook or catch. Each half of this disk is formed with openings *n* and pointed spurs or flanges *o*, the openings being for the passage of the cream, and the spurs for the purpose of agitating and cutting the same. The spurs upon one half of the disk project laterally toward one of the sections of the dasher, while the spurs upon the other half project laterally from the other side of the disk to the remaining dasher-section, and, as shown, the end of each section will be adjacent to the projecting spurs of the nearest half of the disk.

What I claim is—

1. In combination with the rotary dasher-shaft and dasher composed of two sections or strips arranged spirally upon the said shaft, the intermediate disk formed with openings and projecting spurs or flanges, substantially as set forth.

2. In combination with the dasher-shaft D and spiral strips or sections *h h* of the dasher, a disk composed of two sections, *i i'*, pivoted together and locked upon the shaft intermediate of the two dasher-sections, said disk having openings *n* and spurs or flanges *o*, substantially as set forth.

In testimony that I claim the above I have hereunto subscribed my name in the presence of two witnesses.

HUGH F. HOGAN.

Witnesses:
 WM. S. KISER,
 ALEXANDER AUMOND.